(12) United States Patent
Zhao et al.

(10) Patent No.: US 9,807,396 B2
(45) Date of Patent: Oct. 31, 2017

(54) METHOD AND APPARATUS FOR SIMPLIFIED MOTION VECTOR PREDICTOR DERIVATION

(71) Applicant: HFI INNOVATION INC., Zhubei, Hsinchu County (TW)

(72) Inventors: Liang Zhao, Harbin (CN); Xun Guo, Beijing (CN); Shaw-Min Lei, Hsinchu County (TW)

(73) Assignee: HFI Innovation Inc., Zhubei (TW)

( * ) Notice: Subject to any disclaimer, the term of this patent is extended or adjusted under 35 U.S.C. 154(b) by 320 days.

(21) Appl. No.: 14/372,752

(22) PCT Filed: Jan. 16, 2013

(86) PCT No.: PCT/CN2013/070542
§ 371 (c)(1),
(2) Date: Jul. 17, 2014

(87) PCT Pub. No.: WO2013/107347
PCT Pub. Date: Jul. 25, 2013

(65) Prior Publication Data
US 2014/0362924 A1  Dec. 11, 2014

(30) Foreign Application Priority Data

Jan. 19, 2012  (WO) ................ PCT/CN2012/070617

(51) Int. Cl.
*H04N 19/51*   (2014.01)
*H04N 19/139*   (2014.01)
(Continued)

(52) U.S. Cl.
CPC ......... *H04N 19/139* (2014.11); *H04N 19/105* (2014.11); *H04N 19/107* (2014.11);
(Continued)

(58) Field of Classification Search
CPC .... H04N 19/503; H04N 19/51; H04N 19/513; H04N 19/52; H04N 19/593
See application file for complete search history.

(56) References Cited

U.S. PATENT DOCUMENTS

| 2009/0304084 | A1 | 12/2009 | Hallapuro et al. |
| 2012/0082229 | A1* | 4/2012 | Su .......................... H04N 19/52 375/240.16 |

(Continued)

FOREIGN PATENT DOCUMENTS

| CN | 101237580 | 8/2008 |
| CN | 101795404 | 8/2010 |

(Continued)

OTHER PUBLICATIONS

Zhao, L., et al.; "Non-CE9: Simplification of AMVP;" Joint Collaborative Team on Video Coding (JCT-VC) of ITU-T SG16 WP3 and ISO/IEC JTC1/SC29/WG11; Feb. 2012; pp. 1-3.

(Continued)

*Primary Examiner* — Md Haque
(74) *Attorney, Agent, or Firm* — Oblon, McClelland, Maier & Neustadt, L.L.P.

(57) ABSTRACT

A method and apparatus for deriving a motion vector predictor (MVP) candidate set for motion vector coding of a current block. Embodiments according to the present invention determine a redundancy-removed spatial MVP candidate set by removing any redundant MVP candidate from the spatial MVP candidate set. The redundancy-removal process does not apply to the temporal MVP candidate. In another embodiment of the present invention, a redundancy-removed spatial-temporal MVP candidate set is determined and the number of candidates in the redundancy-removed spatial-temporal MVP candidate set is checked to determine whether it is smaller than a threshold. If the number of candidates is smaller than the threshold, a zero (Continued)

motion vector is added to the redundancy-removed spatial-temporal MVP candidate set. The redundancy-removed spatial-temporal MVP candidate set is then provided for encoding or decoding of the motion vector of the current block.

12 Claims, 5 Drawing Sheets

(51) Int. Cl.
      *H04N 19/52*     (2014.01)
      *H04N 19/503*    (2014.01)
      *H04N 19/593*    (2014.01)
      *H04N 19/513*    (2014.01)
      *H04N 19/105*    (2014.01)
      *H04N 19/176*    (2014.01)
      *H04N 19/107*    (2014.01)
      *H04N 19/56*     (2014.01)
      *H04N 19/70*     (2014.01)

(52) U.S. Cl.
     CPC ......... *H04N 19/176* (2014.11); *H04N 19/503* (2014.11); *H04N 19/51* (2014.11); *H04N 19/513* (2014.11); *H04N 19/52* (2014.11); *H04N 19/56* (2014.11); *H04N 19/593* (2014.11); *H04N 19/70* (2014.11)

(56) References Cited

U.S. PATENT DOCUMENTS

2012/0195368 A1* 8/2012 Chien ............... H04N 19/52
                                                   375/240.02
2012/0307903 A1* 12/2012 Sugio ............... H04N 19/521
                                                     375/240.16
2012/0320969 A1* 12/2012 Zheng ............... H04N 19/40
                                                     375/240.02

FOREIGN PATENT DOCUMENTS

| EP | 2 224 737 | 9/2010 |
| WO | 2012042882 A1 | 4/2012 |
| WO | 2012102927 A1 | 8/2012 |

OTHER PUBLICATIONS

Bross, B., et al.; "Working Draft 5 of High-Efficiency Video Coding;" ISO/IEC 23008—HEVC; Nov. 2011; pp. 1-205.

McCann, K., et al.; "High Efficiency Video Coding (HEVC) Test Model 4 Encoder Description;" Joint Collaborative Team on Video Coding (JCT-VC) of ITU-T SG16 WP3 and ISO/IEC JTC1/SC29/WG11; Jul. 2011; pp. 1-36.

Zheng, Y., et al.; "Simplification and Improvement of Additional Merge Candidate;" Joint Collaborative Team on Video Coding (JCT-VC) of ITU-T SG16 WP3 and ISO/IEC JTC1/SC29/WG11; Nov. 2011; pp. 1-8.

Sugio, T., et al.; "Simplification on AMVP/Merge;" Joint Collaborative Team on Video Coding (JCT-VC) of ITU-T SG16 WP3 and ISO/IEC JTC1/SC29/WG11; Nov. 2011; pp. 1-11.

Bici, O., et al.; "Simplification of Merge Mode;" Joint Collaborative Team on Video Coding (JCT-VC) of ITU-T SG16 WP3 and ISO/IEC JTC1/SC29/WG11; Nov. 2011; pp. 1-11.

Zhou, M.; "Evaluation Results on Merge Mode in HM2.0;" Joint Collaborative Team on Video Coding (JCT-VC) of ITU-T SG16 WP3 and ISO/IEC JTC1/SC29/WG11; Mar. 2011; pp. 1-7.

Lim, S.C., et al.;"Simplification on AMVP List Construction;" Joint Collaborative Team on Video Coding (JCT-VC) of ITU-T SG16 WP3 and ISO/IEC JTC1/SC29/WG11; Feb. 2012; pp. 1-5.

Jung, J., et al,; "Description of Core Experiment CE13: Motion Data Parsing Robustness and Throughput;" Joint Collaborative Team on Video Coding (JCT-VC) of ITU-T SG16 WP3 and ISO/IEC JTC1/SC29/WG11; Jul. 2011; pp. 1-10.

Fujibayashi, A., et al.; "CE9 3.2d Simplified Motion Vector Prediction;" Joint Collaborative Team on Video Coding (JCT-VC) of ITU-T SG16 WP3 and ISO/IEC JTC1/SC29/WG11; Jan. 2011; pp. 1-5.

Liang Zhao et. al. Simplified AMVP for High Efficiency Video Coding. Visual Communication and Image Processing (VCIP) 2012 IEEE. Nov. 30, 2012(Nov. 30, 2012), pp. 1-4, sections 2-3.

Zheng, et al.: "Unified Motion Vector Predictor Selection for Merge and AMVP"; Joint Collaborative Team on Video Coding (JCT-VC) ofiTU-T SG16 WP3 and ISO/IEC JTC1/SC29/WG11; Mar. 16, 2011; pp. 1-5.

\* cited by examiner

METHOD AND APPARATUS FOR SIMPLIFIED MOTION VECTOR PREDICTOR DERIVATION

CROSS REFERENCE TO RELATED APPLICATIONS

The present invention claims priority to PCT Patent Application Serial No. PCT/CN2012/070617, filed on Jan. 19, 2012, entitled "Methods and Apparatuses of AMVP Simplification". The PCT Patent Application is hereby incorporated by reference in its entirety.

FIELD OF INVENTION

The present invention relates to video coding. In particular, the present invention relates to simplified derivation of motion vector predictor (MVP) for High Efficiency Video Coding (HEVC).

BACKGROUND OF THE INVENTION

High-Efficiency Video Coding (HEVC) is a new international video coding standard that is being developed by the Joint Collaborative Team on Video Coding (JCT-VC). HEVC is based on block-based motion-compensated transform coding architecture. The basic unit for compression, termed Coding Unit (CU), is a 2N×2N square block, and each CU can be recursively split into four smaller CUs until a predefined minimum size is reached. Each CU contains one or multiple Prediction Units (PUs). The PU sizes can be 2N×2N, 2N×N, 2N×nU, 2N×nD, N×2N, nL×2N, nR×2N, or N×N, where 2N×N, 2N×nU, 2N×nD and N×2N, nL×2N, nR×2N correspond to horizontal and vertical partition of a 2N×2N PU with symmetric or asymmetric PU size division respectively.

Figure 1:
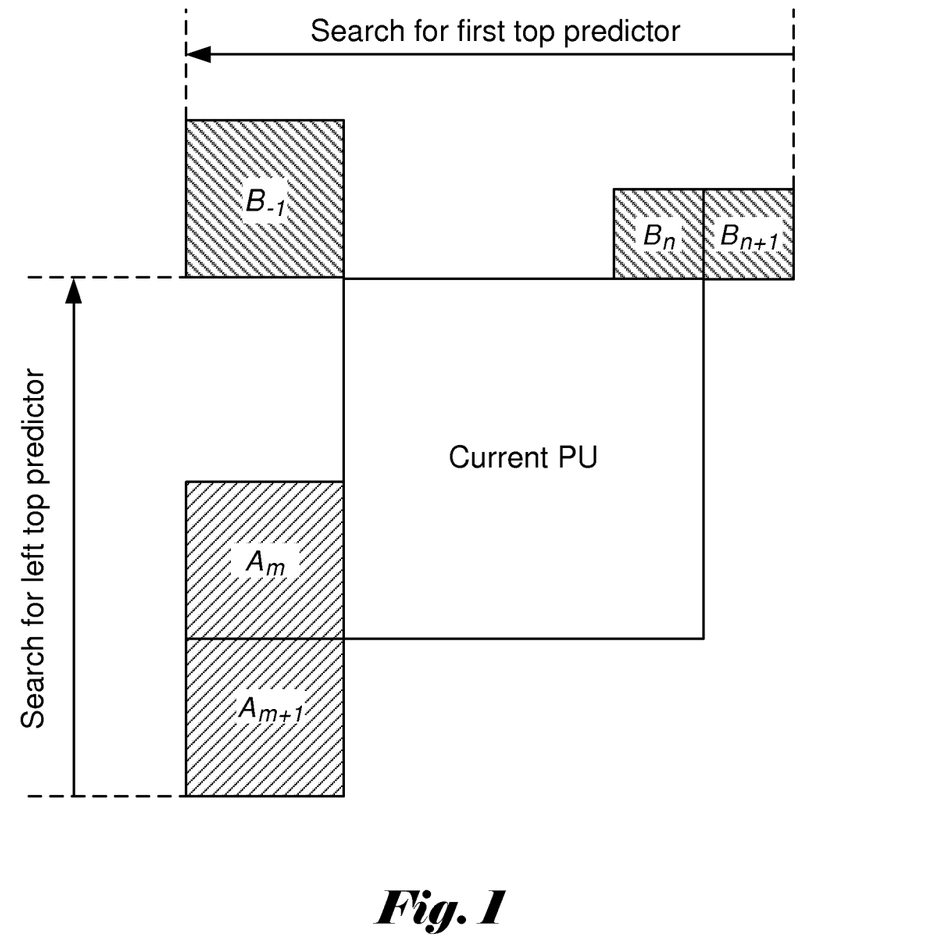
FIG. 1 illustrates an example of neighboring block configuration used to derive MVP candidate set for Inter mode based on AMVP scheme in HM5.0.

To further increase the coding efficiency of motion vector coding in HEVC, the motion vector competition (MVC) based scheme is used to select one motion vector predictor (MVP) among a given MVP candidate set which includes spatial and temporal MVPs. For the Inter mode in HM-5.0, the Advanced Motion Vector Prediction (AMVP) scheme is used to select a motion vector predictor among an AMVP candidate set including two spatial MVPs and one temporal MVP. The MVP candidate set is used to code the motion vector (MV) of an underlying block. FIG. 1 illustrates the spatial MVP candidates for the Inter mode according to HM-5.0, where the two spatial MVPs are:

1. Left spatial predictor (the first available MV from $A_{m+1}$ and $A_m$), and
2. Top spatial predictor (the first available MV from $B_{n+1}$, $B_n$, and $B_{-1}$).

The five spatial candidate blocks are divided into left predictor group and top predictor group. The first available MV from the candidate blocks in each group is selected as the spatial MVP derived from the group. The search order for the first available MV associated with the neighboring blocks in each group is indicated by the arrows in FIG. 1. For the top candidate blocks, the search order is from right to left. For the left candidate blocks, the search order is from bottom to top. The left-side neighboring blocks comprise a lower-left block ($A_{m+1}$) and a bottom-aligned left block ($A_m$). The top-side neighboring blocks comprise three blocks corresponding to an upper-left block ($B_{-1}$), a right-aligned top block ($B_n$) and an upper-right block ($B_{n+1}$). During the MVP derivation process, there may be situations that none of the candidate blocks has an associated MV. In this case, the MVP is not available for the group. For example, if neither $A_m$ nor $A_{m+1}$ has an associated MV, the left predictor does not exist. Therefore, the AMVP candidate set may contain less than 3 MVP candidates.

After the spatial predictors are derived, a temporal predictor is derived and added to the MVP candidate set. After all the spatial and temporal predictors are derived, a redundancy checking process is performed to identify and remove any duplicated candidate. Therefore, the maximum number of checking operations associated with the redundancy checking is 3. After the redundancy checking/removal process is performed, the number of existing candidates is checked. If the number is smaller than a threshold, a zero motion vector checking process is performed. The threshold is set to the maximum number of AMVP candidates indicated by AMVP_MAX_NUM_CANDS in HM-5.0 (AMVP_MAX_NUM_CANDS=2). The zero MV checking process checks whether the zero MV exists in the current candidate set. If the zero MV is not in the current candidate set, it is added to the MVP candidate set. In this process, there is one checking operation needed. Therefore, the maximum number of checking operations for the two checking processes mentioned above is 4.

Figure 2:
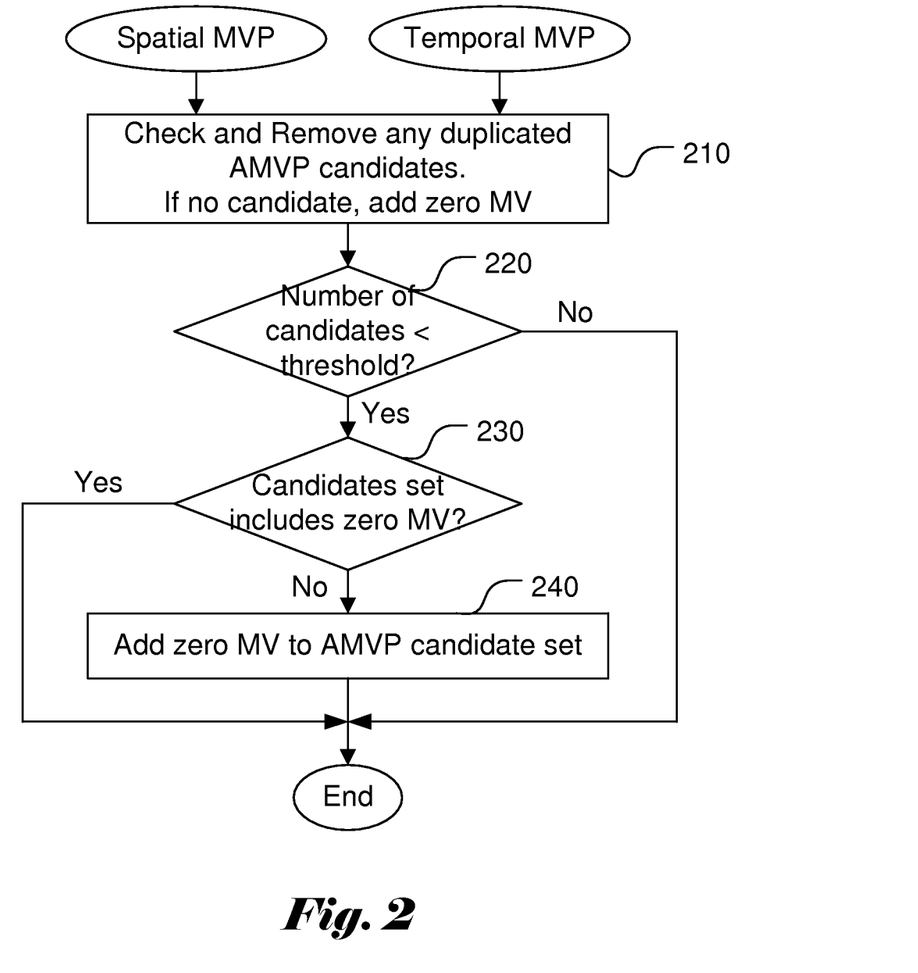
FIG. 2 illustrates an example of derivation process to determine AMVP candidate set according to HM-5.0.

FIG. 2 illustrates a decision flowchart of the MVP derivation according to HM-5.0. The MVP candidates, including the spatial MVP and the temporal MVP, are provided to redundancy checking process in step 210. The redundancy checking process checks whether any duplication exists in the MVP candidates. If there is any duplicated MVP candidate, the duplicated MVP candidate is removed. If there is no MVP candidate exists, the zero MV is added to the MVP candidate set. The number of AMVP candidates is then checked to determine whether it is smaller than 2 in step 220. If the number of MVP candidates is not smaller than 2, the decision process is terminated. Otherwise, the zero MV checking process is performed in step 230 to determine whether the MVP candidate set includes the zero MV. If the MVP candidate set does not include the zero MV, the zero MV is added to the MVP candidate set as shown in step 240. Otherwise, the decision process is terminated. The decision process for the MVP candidate set involves quite a few checking operations. It is desirable to reduce the required number of operations to speed up system operation.

SUMMARY OF THE INVENTION

A method and apparatus for deriving a motion vector predictor (MVP) candidate set for motion vector coding of a block. Embodiments according to the present invention determine a redundancy-removed spatial MVP candidate set by removing any redundant MVP candidate from the spatial MVP candidate set. The redundancy-removal process does not apply to the temporal MVP candidate. Since the spatial MVP candidate set comprises at most a top spatial candidate and a left spatial candidate, the redundancy-removal process only requires one checking operation at most, while the conventional redundancy-removal process requires up to three checking operations. After the redundancy-removal process, the temporal MVP candidate is included to form a redundancy-removed spatial-temporal MVP candidate set. The redundancy-removed spatial-temporal MVP candidate set is then provided for encoding or decoding of the motion vector of an underlying block.

In another embodiment of the present invention, a redundancy-removed spatial-temporal MVP candidate set is determined and the number of candidates in the redundancy-removed spatial-temporal MVP candidate set is checked to determine whether it is smaller than a threshold (for example, the threshold is 2). If the number of candidates is smaller than the threshold, the zero MV is added to the redundancy-removed spatial-temporal MVP candidate set. In a conventional approach, an additional checking operation is performed before adding the zero MV. Therefore, an embodiment according to the present invention reduces one more checking operation. The redundancy-removed spatial-temporal MVP candidate set is then provided for encoding or decoding of the motion vector of the current block.

DETAILED DESCRIPTION

Embodiments of the present invention simplify the MVP candidate derivation process. In one embodiment, the MVP redundant candidate checking is only applied to the two spatial MVP candidates. The temporal MVP candidate is excluded from the redundancy checking process. In this simplified checking process, the redundancy is checked between two spatial MVP candidates. Therefore, there is one comparison operation at most (no operation is needed if one or both the MVP candidates are not available). The maximum number of checking operations is reduced from 3 to 1 according to an embodiment of the present invention. After redundancy checking is applied to the spatial MVPs, the temporal MVP is included in the MVP candidate set.

After the spatial MVPs and the temporal MVP are derived, the number of MVP candidates is checked to determine whether it is smaller than a threshold, for example, 2. If the number is smaller than 2, the MVP derivation process checks whether the MVP candidates include the zero motion vector according to the conventional approach based on HM-5.0. If the zero MV is not included in the MVP candidate set, the zero MV is added to the MVP candidate set. In another embodiment of the present invention, when the number of MVP candidates is smaller than a threshold, the MVP derivation process does not check whether the MVP candidate set includes the zero MV. Instead, the MVP derivation process directly adds the zero MV to the MVP candidate set without checking whether the MVP candidates include the zero MV. An embodiment of the present invention can be incorporated into HM-5.0 and the threshold indicated by AMVP_MAX_NUM_CANDS can be set to 2 (AMVP_MAX_NUM_CANDS=2). Therefore, once the number of existing spatial and temporal MVP candidates is smaller than 2, the zero MV is added to the MVP candidate set. In an embodiment, when the number of candidates in the MVP candidate set is smaller than a threshold, the zero MV will be added to the candidate set until the number reaches 2. In other words, there may be more than one zero MVs added into the MVP candidate set.

Figure 3:
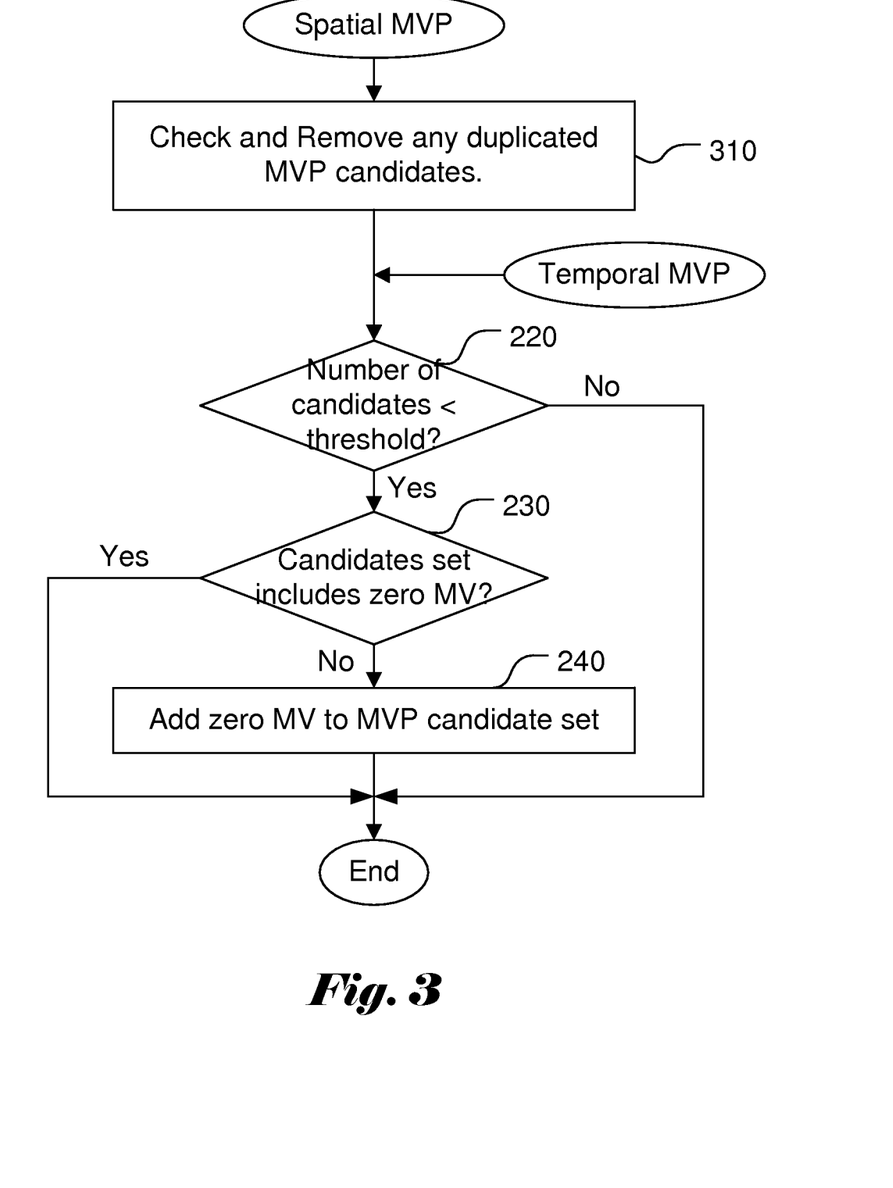
FIG. 3 illustrates an example of simplified derivation process to determine AMVP candidate set according to an embodiment of the present invention.

FIG. 3 illustrates a decision flowchart of the MVP derivation according to an embodiment of the present invention. As shown in step 310 of FIG. 3, only the spatial MVP candidates are provided to the process for duplicated MVP candidate checking and removal. As mentioned before, the number of maximum checking operations is reduced from 3 to 1. After the spatial redundant MVP candidate checking/removal in step 310, the temporal MVP candidate is included to form a spatial-temporal MVP candidate set. The remaining process can be the same as that of FIG. 2, and accordingly the same reference numbers are used for the remaining steps.

Figure 4:
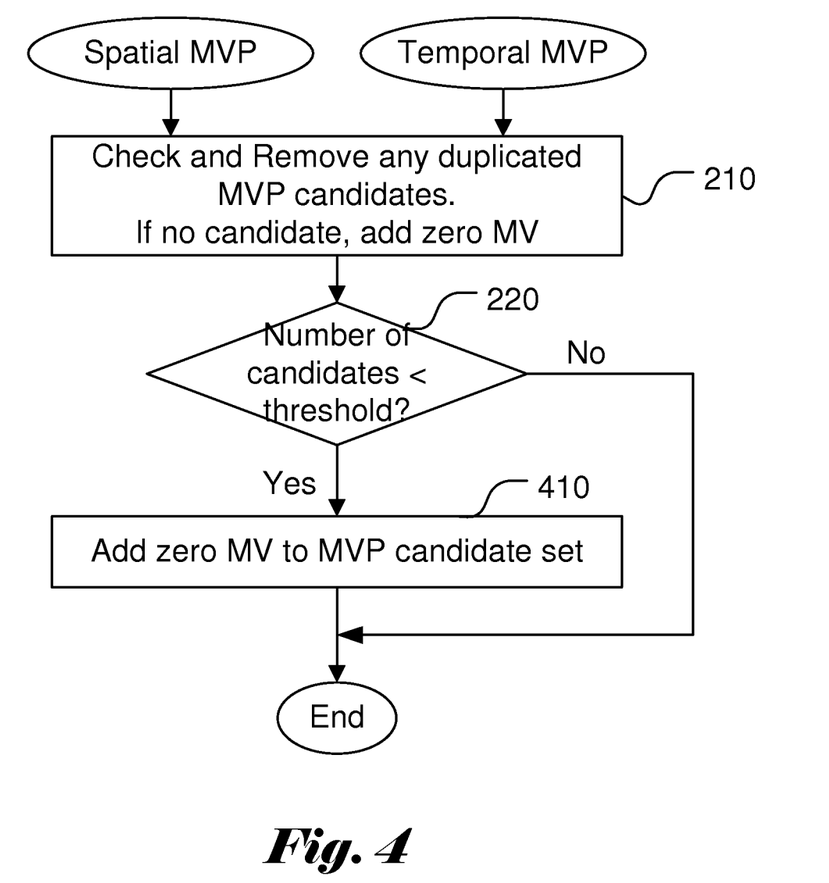
FIG. 4 illustrates an example of simplified derivation process to determine AMVP candidate set according to another embodiment of the present invention.

FIG. 4 illustrates a decision flowchart of the MVP derivation according to another embodiment of the present invention. The steps of checking and removal of duplicated MVP candidate is the same as that in FIG. 2. However, if the number of MVP candidates is smaller than a threshold (for example, the threshold is 2), the MVP derivation process will directly add zero MV to the MVP candidate set without checking whether the MVP candidate set includes the zero MV as shown in step 410.

Figure 5:
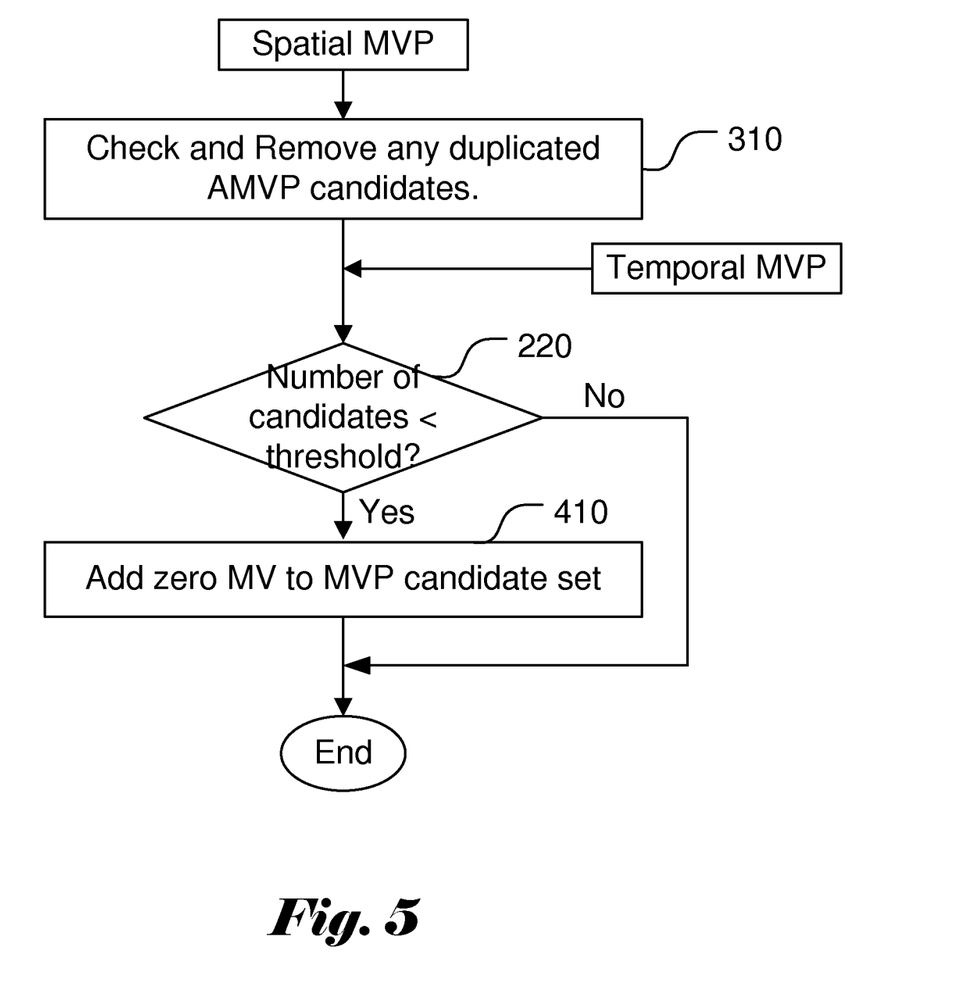
FIG. 5 illustrates an example of simplified derivation process to determine AMVP candidate set according to yet another embodiment of the present invention.

FIG. 5 illustrates a decision flowchart of the MVP derivation according to yet another embodiment of the present invention. In FIG. 5, the duplicated MVP candidate checking and removal is performed for the spatial MVPs only and the checking for whether the MVP candidate set includes the zero MV is omitted when the number of MVP candidates is smaller than a threshold (for example, the threshold is 2).

The system performance of the simplified system is compared with a conventional HM-5.0 system. The performance is measured in terms of BD rate, where a negative value implies performance improvement over the reference system. The BD rate comparison is performed by adjusting coding parameters while maintaining about the same objective quality for the underlying systems. The results are shown in Table 1 for various system configurations, where RA corresponds to random access, LD corresponds to low delay, HE corresponds to high efficiency, LC corresponds to low complexity and HE-10 corresponds to high efficiency (10-bit). The impact on system performance in terms of BD rate is very small. Also, the impact on system run time is very small.

TABLE 1

|    |       | Δrate Y | Δrate U | Δrate V | Enc. Time (%) | Dec. Time (%) |
|----|-------|---------|---------|---------|---------------|---------------|
| RA | HE    | 0.01%   | −0.02%  | 0.02%   | 100           | 100           |
|    | LC    | 0.02%   | 0.01%   | 0.00%   | 100           | 101           |
|    | HE-10 | 0.04%   | 0.05%   | 0.06%   |               |               |
| LD | HE    | 0.04%   | −0.02%  | 0.05%   | 100           | 100           |
|    | LC    | 0.02%   | −0.08%  | 0.20%   | 101           | 101           |

The MVP candidate set derived according to the simplified MVP method as disclosed above can be used for encoding and decoding of a motion vector of an inter-coded block. In the encoder, the motion vector of the current block is predictively coded based on the MVP candidate set. The prediction residue of the underlying motion vector is coded so that the prediction residue can be recovered at the decoder. The decoder can derive the MVP candidate set according to the simplified MVP. The MVP candidate set method is then used with the recovered prediction residue to reconstruct the current motion vector.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced. Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of deriving a motion vector predictor (MVP) candidate set for motion vector coding of a block, the method comprising:
    determining a top spatial MVP candidate according to a first available motion vector of top-side neighboring blocks of a current block;
    determining a left spatial MVP candidate according to a first available motion vector of left-side neighboring blocks of the current block;
    performing at most one redundancy checking on a spatial MVP candidate set to determine a redundancy-removed spatial MVP candidate set by removing a redundant MVP candidate from the spatial MVP candidate set if the redundant MVP candidate exists, and the redundancy-removed spatial MVP candidate set is same as the spatial MVP candidate set otherwise, wherein the spatial MVP candidate set includes at most the top spatial MVP candidate and the left spatial MVP candidate, and the redundancy-removed spatial MVP candidate set includes at most the top spatial MVP candidate and the left spatial MVP candidate;
    determining a redundancy-removed spatial-temporal MVP candidate set, wherein the redundancy-removed spatial-temporal MVP candidate set includes the redundancy-removed MVP candidate set and a temporal MVP candidate;
    checking whether a number of MVP candidates in the redundancy-removed spatial-temporal MVP candidate set is smaller than a threshold;
    adding a zero motion vector to the redundancy-removed spatial-temporal MVP candidate set if the number is smaller than the threshold; and
    providing the redundancy-removed spatial-temporal MVP candidate set for encoding or decoding of the motion vector of the current block.

2. The method of claim 1, wherein the threshold corresponds to two.

3. The method of claim 1, wherein said determining the top spatial MVP candidate checks the top-side neighboring blocks from right to left.

4. The method of claim 1, wherein said determining the left spatial MVP candidate checks the left-side neighboring blocks from bottom to top.

5. The method of claim 1, wherein the top-side neighboring blocks comprise an upper-left block, a right-aligned top block and an upper-right block.

6. The method of claim 1, wherein the left-side neighboring blocks comprise a lower-left block and a bottom-aligned left block.

7. An apparatus of deriving a motion vector predictor (MVP) candidate set for motion vector coding of a block, the apparatus comprising a circuit integrated into a video chip, the circuit to perform:
    determining a top spatial MVP candidate according to a first available motion vector of top-side neighboring blocks of a current block;
    determining a left spatial MVP candidate according to a first available motion vector of left-side neighboring blocks of the current block;
    performing at most one redundancy checking on a spatial MVP candidate set to determine a redundancy-removed spatial MVP candidate set by removing a redundant MVP candidate from the spatial MVP candidate set if the redundant MVP candidate exists, and the redundancy-removed spatial MVP candidate set is same as the spatial MVP candidate set otherwise, wherein the spatial MVP candidate set includes at most the top spatial MVP candidate and the left spatial MVP candidate, and the redundancy-removed spatial MVP candidate set includes at most the top spatial MVP candidate and the left spatial MVP candidate;
    determining a redundancy-removed spatial-temporal MVP candidate set, wherein the redundancy-removed spatial-temporal MVP candidate set includes the redundancy-removed MVP candidate set and a temporal MVP candidate;
    checking whether a number of MVP candidates in the redundancy-removed spatial-temporal MVP candidate set is smaller than a threshold;
    adding a zero motion vector to the redundancy-removed spatial-temporal MVP candidate set if the number is smaller than the threshold; and
    providing the redundancy-removed spatial-temporal MVP candidate set for encoding or decoding of the motion vector of the current block.

8. The apparatus of claim 7, wherein the threshold corresponds to two.

9. The apparatus of claim 7, wherein the circuit to perform determining the top spatial MVP candidate further checks the top-side neighboring blocks from right to left.

10. The apparatus of claim 7, wherein the circuit to perform determining the left spatial MVP candidate further checks the left-side neighboring blocks from bottom to top.

11. The apparatus of claim 7, wherein the top-side neighboring blocks comprise an upper-left block, a right-aligned top block and an upper-right block.

12. The apparatus of claim 7, wherein the left-side neighboring blocks comprise a lower-left block and a bottom-aligned left block.

* * * * *

UNITED STATES PATENT AND TRADEMARK OFFICE
CERTIFICATE OF CORRECTION

PATENT NO. : 9,807,396 B2
APPLICATION NO. : 14/372752
DATED : October 31, 2017
INVENTOR(S) : Liang Zhao et al.

Page 1 of 1

It is certified that error appears in the above-identified patent and that said Letters Patent is hereby corrected as shown below:

In the Claims

Column 6, Claim 1, Lines 5-6, "the redundancy-removed MVP candidate set" should read --the redundancy-removed spatial MVP candidate set--.

Column 6, Claim 7, Lines 56-57, "the redundancy-removed MVP candidate set" should read --the redundancy-removed spatial MVP candidate set--.

Signed and Sealed this
Ninth Day of June, 2020

Andrei Iancu
*Director of the United States Patent and Trademark Office*